United States Patent
Mutz et al.

(10) Patent No.: US 11,194,011 B2
(45) Date of Patent: Dec. 7, 2021

(54) DEVICES AND METHODS FOR TRANSMITTING AND RECEIVING, SIGNAL TRANSMITTER-RECEIVER

(71) Applicant: Blinksight, Colombelles (FR)

(72) Inventors: Stéphane Mutz, Cuverville (FR); Matthieu Mutz, Caen (FR)

(73) Assignee: Blinksight, Colombelles (FR)

( * ) Notice: Subject to any disclaimer, the term of this patent is extended or adjusted under 35 U.S.C. 154(b) by 185 days.

(21) Appl. No.: 16/482,346

(22) PCT Filed: Feb. 1, 2017

(86) PCT No.: PCT/FR2017/050224
§ 371 (c)(1),
(2) Date: Nov. 8, 2019

(87) PCT Pub. No.: WO2018/142032
PCT Pub. Date: Aug. 9, 2018

(65) Prior Publication Data
US 2020/0158813 A1    May 21, 2020

(51) Int. Cl.
*G01S 5/14*        (2006.01)
*G01S 5/02*        (2010.01)

(52) U.S. Cl.
CPC .......... *G01S 5/0273* (2013.01); *G01S 5/0284* (2013.01)

(58) Field of Classification Search
CPC . H04W 28/06; H04W 52/0229; H04W 64/00; H04W 16/14; H04W 52/241;
(Continued)

(56) References Cited

U.S. PATENT DOCUMENTS 8,432,889 B2 * 4/2013 Hong ............... H04L 1/0072
                                                 370/349
8,462,720 B2 * 6/2013 Hong ............... H04W 28/06
                                                 370/329
(Continued)

FOREIGN PATENT DOCUMENTS

EP        2375669 A1      10/2011
WO    WO-2007/021292 A2    2/2007
WO    WO-2015/101674 A1    7/2015

OTHER PUBLICATIONS

Guvenc, I. & Sahinoglu, Z., "Threshold-Based TOA Estimation for Impulse Radio UWB Systems", Ultra-Wideband, 2005 IEEE International Conference in Zurich, Switzerland Sep. 5-8, 2005, Piscataway, NJ, USA, Sep. 5, 2005, pp. 420-425, XP010873336, ISBN 978-0-7803-9397-4.
(Continued)

*Primary Examiner* — Nhan T Le
(74) *Attorney, Agent, or Firm* — Sterne, Kessler, Goldstein & Fox P.L.L.C.

(57)         ABSTRACT

The invention relates to a device for transmitting an ultra-wideband-type signal, the signal including, one after the other temporally, a synchronization header and a data payload field. The transmission device includes a first generator to generate first synchronization header symbols and a third generator to generate third data payload symbols. The transmission device further includes a time sequencing device for sequencing the first and third symbols in a sequence of symbols, successively including the first symbols in the synchronization header and the third symbols in the data payload field. The transmission device further includes at least one antenna, capable of transmitting the signal including the sequence. The transmission device additionally includes a fourth generator to generate at least one fourth secret symbol, the time sequencing device being configured
(Continued)

to insert the at least one fourth secret symbol into the sequence of symbols.

13 Claims, 5 Drawing Sheets

(58) Field of Classification Search
CPC ....... H04W 56/00; H04W 88/02; G01S 11/08; G01S 5/0215; G01S 5/0273; G01S 5/0284

See application file for complete search history.

(56) References Cited

U.S. PATENT DOCUMENTS

| | | | |
|---|---|---|---|
| 9,413,418 B2* | 8/2016 | Bottazzi | G01S 13/75 |
| 10,355,896 B2* | 7/2019 | Lomayev | H04L 27/2601 |
| 2004/0264701 A1 | 12/2004 | Lee et al. | |
| 2015/0223076 A1* | 8/2015 | Santhoff | H04L 69/40 375/219 |
| 2016/0226845 A1 | 8/2016 | Kim et al. | |

OTHER PUBLICATIONS

Reichman, A., "UWB PHY for Body Area Networks," 2010 IEEE 26-th Convention of Electrical and Electronics Engineers in Israel, 2010, pp. 000603-000607.

International Search Report, for International application No. PCT/FR2017/050224, dated Oct. 25, 2017, 7 pages.

International Preliminary Examination Report / Written Opinion, for International application No. PCT/FR2017/050224, dated Aug. 15, 2019, 8 pages.

* cited by examiner

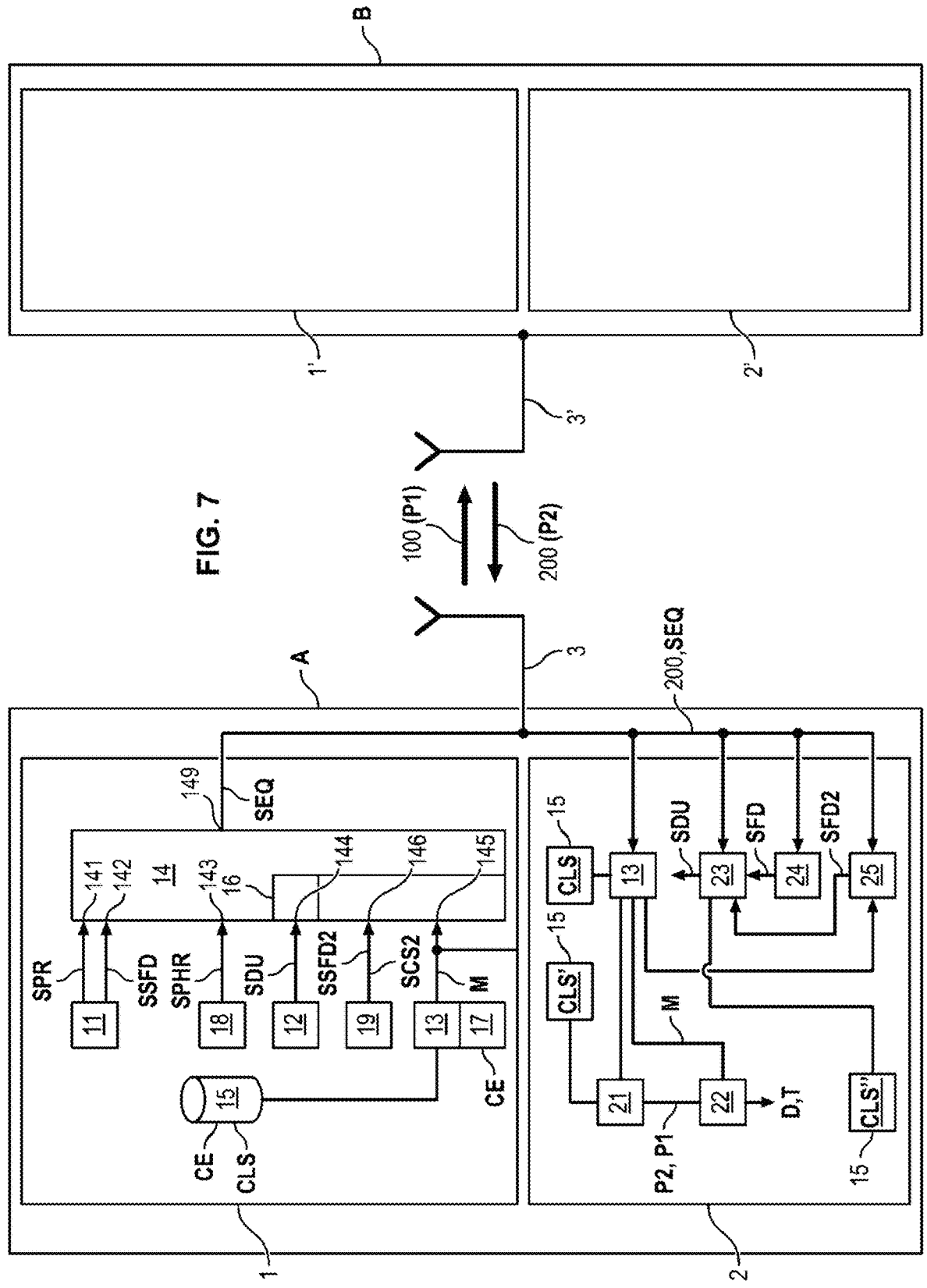

DEVICES AND METHODS FOR TRANSMITTING AND RECEIVING, SIGNAL TRANSMITTER-RECEIVER

TECHNICAL FIELD

The invention relates to a device for transmitting and/or receiving an ultra-wideband signal.

One field of application of the invention relates to devices for calculating the position of the device and/or the distance of the device from another object.

These devices can use signal "time of arrival" (TOA) calculation techniques or signal "time difference of arrival" (TDOA) calculation techniques.

In such applications, information on the time-of-flight of a transmitted signal is known to be used. The measurement of this time-of-flight makes it possible to measure the distance separating two devices. For example, to calculate the distance between a transmitting device and a receiving device, a back-and-forth message exchange is used between them for this purpose. Thus, the measurement of the time elapsed between the emission of a first message from a first device to a second remote device and the reception of a response message from the second device to the first device enables the time-of-flight of the messages between them to be determined, which can be converted into an estimate of the distance between them.

The messages involved in this exchange are usually composed of three distinct parts: a preamble enabling the synchronization of each receiving device in a predetermined sequence, a Start-of-Frame Delimiter (SFD) that indicates the end of the preamble sequence and the beginning of the data payload portion, the data payload portion carrying useful data bits and possibly a data header.

BACKGROUND

A location system using this message format is described, for example, in the document WO 2015/101 674, where the packet start marker located between a synchronization header and a data field, which time marker makes it possible to identify the exact time of transmission and/or arrival of a message and the boundary between the end of the packet start delimiter and the beginning of the data field, is used in messages transmitted and received.

The WO document 2007/021292 discloses a method of measuring the distance between two first and second apparatuses, wherein the second apparatus responds to a first message of distance measurement sent by the first apparatus after a delay known only by the two apparatuses, the delay being selected by the first or second apparatus, then encrypted and sent to the second or first apparatus in a notification message before or after the response.

One of the advantages of ultra-wideband systems for distance computing applications is their immunity relative to multi-path propagation channels. The receiver can receive signals from multiple paths in the environment.

However, under indoor propagation conditions, i.e., in a building, the path of direct propagation may not be the one with the highest intensity, due to attenuation effects and reflections in the environment, which can produce an indirect path with a lower attenuation and a better signal-to-noise ratio than the direct path. Typically, in the state of the art, a receiver synchronizes on the dominant path, i.e., the path having the strongest intensity signal, but that may not be the direct path, i.e., the shortest path between a transmission device and a remote receiving device.

This, therefore, has the drawback of overestimating the distance between the two devices.

In order to obtain an accurate estimate of the distance between the two devices, the first device must estimate how much the distance could have been overstated due to the synchronization on the path with the strongest intensity. This is typically done by performing a search of the leading edge in an estimate of the impulse response of the channel. The document "Threshold-Based TOA Estimation for Impulse Radio UWB Systems", Sahinoglu Z, Guvenc I, Ultra-Wideband, 2005 IEEE International Conference in Zurich, Switzerland 5-8 Sep. 2005, Piscataway, N.J., USA, 5 Sep. 2005, pages 420-425, XP010873336, ISBN 978-0-7803-9397-4, describes such a leading edge search system. This estimate can be made during the preamble of the message using autocorrelation properties of the preamble sequence. Thus, by searching for the earliest appearing leading edge in the impulse response of the channel, the receiving device can obtain the time position of the direct path with respect to a synchronization point. Adjusting the round-trip time measurement by this correction of the leading edge provides a more accurate estimate of the actual distance between the two devices.

In addition, some applications require that the distance between the two devices be known precisely and in such a way that cannot be altered by a fraudulent individual.

For example, one possible scenario is where a person holding the first device can access a restricted access resource (e.g., opening a door of a building) only by getting close enough to the second device. A fraudster can try to access this resource by deceiving the system and making it believe that the first device is closer to the second device than is actually the case. For example, the door will open only when the first device is at a distance of less than one meter away from the second device. The fraudster can position himself near the door by placing the first device at a distance of ten meters away from the second device. By making the second device believe that the first device is nine meters closer, the fraudster can open the door. For this application, it is therefore essential that the fraudster cannot alter the exchange of messages between the two devices and that he cannot cause a distance to be estimated that appears shorter than it actually is.

Typical implementations are based on an estimate of the channel's impulse response, which is constructed during the preamble sequence to search for the direct path. However, the synchronization sequence must be known in advance by all the communicating devices and is repeated. A fraudster, knowing the sequence of the preamble involved in the communications between the two devices, can create a copy of the preamble sequence, shifted by a little less than a preamble symbol period. Thanks to that, in the channel impulse response built by the receiver of the second device, the copy created by the fraudster appears as a multi-path propagation component occurring before the actual direct propagation path between the first device and the second device. In this case, the leading edge detection algorithm will assign this copy a unit of distance shorter than the actual distance.

BRIEF DESCRIPTION OF THE DRAWINGS/FIGURES

FIG. 7 illustrates a schematic representaiton of a transmission device and a receiving device, according to some embodiments of this disclosure.

DETAILED DESCRIPTION

Figure 1:
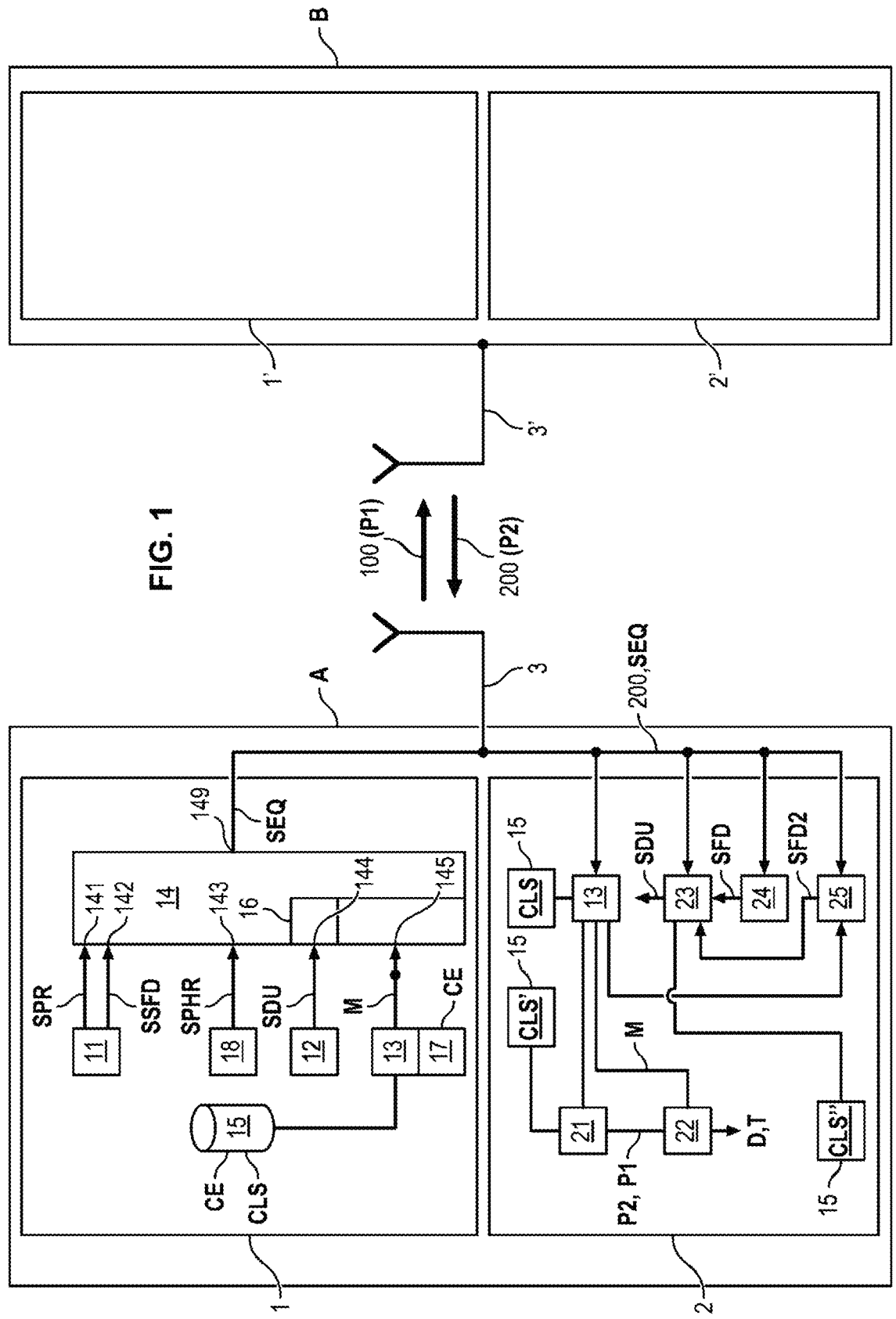
FIG. 1 illustrates a schematic representaiton of a transmission device and a receiving device, according to some embodiments of this disclosure.

The invention aims to achieve a device that overcomes the drawbacks of the state of the art and enables a more rigorous detection of the leading edge of the signals, so that only the original multi-path propagation components of the first device are detected by the second device.

A first object of the invention is a device (1, 1') that emits an ultra-wideband type signal (100), the signal (100) comprising, one after the other temporally, a synchronization header (SHR, PR, SFD), and a data payload data field (PSDU).

the transmission device (1, 1') comprising a first generator (11) to generate first synchronization header symbols (SPR, SSFD) and a third generator (12) to generate third data data payload symbols (SDU), the transmission device (1, 1') comprising a time sequencing device (14) for sequencing the first and third symbols (SPR, SSFD, SDU) in a sequence (SEQ) of symbols, successively comprising the first symbols (SPR, SSFD) in the synchronization header (SHR, PR, SFD) and the third symbols (SDU) in the data data payload field (PSDU), the transmission device (1, 1') comprising at least one antenna (3), capable of transmitting the signal (100) comprising the sequence (SEQ) of symbols, where the transmission device (1, 1') further comprises a fourth generator (13) to generate at least one fourth secret symbol (M), the time sequencing device (14) being configured to insert at least one fourth secret symbol (M) into the sequence (SEQ) of symbols.

Although negotiated confidentially between authenticated peers, the synchronization headers described in the state of the art must have autocorrelation properties that make them easily identifiable, since the synchronization header is a periodic repetition of several symbols (usually a high number, greater than 100). A fraudster can therefore implement a correlation of the signal with himself to identify the sequence used and substitute it with a malicious signal altering the position of the direct path.

By comparison, the invention eliminates the constraint of using the synchronization header and eliminates the need to present a long repetition sequence of the same symbol. It is sufficient that the fourth symbols inserted in the bit-stream have an a priori determinable structure and that they individually have good autocorrelation properties.

Another advantage of the invention lies in the increased capacity, due to the fact of no longer being held at two discrete signal exchanges. This results in both an optimized use of the radio medium and a lower consumption at the transmitter/receiver level.

According to one embodiment, the time sequencing device (14) is configured to insert at least one fourth secret symbol (M) into the synchronization header (SHR, PR, SFD) and/or into the data data payload field (PSDU).

According to one embodiment, the signal (100) comprises a physical layer header (PHR) temporally after the synchronization header (SHR, PR, SFD) and before the data data payload field (PSDU). The transmission device (1, 1') can comprise a second generator (18) to generate second physical layer header symbols (SPHR). The time sequencing device (14) is configured to insert at least one fourth secret symbol (M) into the physical layer header (PHR).

According to one embodiment, the synchronization header (SHR) comprises a preamble (PR) and a start-of-frame delimiter (SFD), temporally after the preamble (PR) and temporally prior to the data payload field (PSDU), the first header symbols (SPR, SSFD) comprise preamble symbols (SPR) and delimiter symbols (SSFD), the time sequencing device (14) is configured to successively sequence the preamble symbols (SPR) in the preamble (PR) and the delimiter symbols (SSFD) in the start-of-frame delimiter (SFD) and to insert at least one fourth secret symbol (M) into the preamble (PR) and/or into the start-of-frame delimiter (SFD).

According to one embodiment, the time sequencing device (14) is configured to insert at least one fourth secret symbol (M) between some of, or in place of, the first or third symbols (SPR, SSFD, SDU) and/or between the first symbols (SPR, SSFD) and the third symbols (SDU).

According to one embodiment, the synchronization header (SHR) comprises a preamble (PR) and a start-of-frame delimiter (SFD), temporally after the preamble (PR) and temporally prior to the data payload field (PSDU), the first header symbols (SPR, SSFD) comprise a preamble symbol sequence (SPR) and a delimiter symbol sequence (SSFD), the fourth generator (13) is capable of generating a sequence of the fourth secret symbols (M), which has a cross-correlation coefficient with the preamble symbol sequence (SPR), less than or equal to 0.2.

According to one embodiment, the fourth generator (13) is capable of generating a sequence of the fourth secret symbols (M), which has an autocorrelation coefficient greater than or equal to 0.8 at a single point and less than 0.2 at any other point.

According to one embodiment, at least one fourth secret symbol (M) is or comprises a symbol (M') for estimating the moment of arrival of the signal (100).

According to one embodiment, the fourth generator (13) generates at least one fourth secret symbol (M) based on a prescribed secret key (CLS).

According to one embodiment, at least one fourth secret symbol (M) is pseudo-random.

According to one embodiment, the time sequencing device (14) is configured to pseudo-randomly generate a time position of at least one fourth secret symbol (M) in the sequence (SEQ) of symbols.

According to one embodiment, a time position of at least one fourth secret symbol (M) in the sequence (SEQ) of symbols is generated by the time sequencing device (14) on the basis of a prescribed secret key (CLS'). This key (CLS') may be the same or different from key (CLS).

According to one embodiment, the fourth generator (13) is configured to generate at least one fourth secret symbol (M) from at least one predetermined spreading code.

According to one embodiment, the predetermined spreading code is obtained from a prescribed secret key (CLS).

According to one embodiment, the fourth generator (13) has a memory (15), wherein several spreading codes (CE) are recorded and a selection device enabling the selection, on the basis of the prescribed secret key (CLS), of the predetermined spreading code among the spreading codes (CE) present in the memory (15).

According to one embodiment, the transmission device comprises a fifth pseudo-random generator (17) to generate a specified number of spreading codes (CE) based on the prescribed secret key (CLS) and a selection device enabling the selection, on the basis of the prescribed secret key (CLS), of the predetermined spreading code among the spreading codes (CE) generated by the fifth pseudo-random generator (17).

According to one embodiment, the transmission device comprises a cryptographic device (16) to encrypt the data payload field (PSDU) in the sequence (SEQ) of symbols on the basis of a prescribed secret key (CLS"), the signal (100) transmitted by the antenna (3) comprising the data payload field (PSDU) encrypted by the cryptographic device (16). This key (CLS") can be identical or different from the key (CLS) or (CLS').

According to one embodiment, the fourth generator (13) is arranged to generate at least one fourth secret symbol (M) from at least one of the third data payload secret symbols (SDU).

According to one embodiment, the transmission device is part of a device that estimates the arrival time.

According to one embodiment, the signal comprises a synchronization field (CS2), which is composed of at least one fourth symbol (M) generated by the fourth generator (13), which is distinct from the synchronization header (SHR, PR, SFD) and which is temporally after the synchronization header (SHR, PR, SFD), the time sequencing device (14) being capable of sequencing at least one fourth symbol (M) of the synchronization field (CS)2) in the sequence (SEQ) of symbols after the synchronization header (SHR, PR, SFD).

According to one embodiment, the signal comprises a synchronization field (SFD2) that partially or totally replaces a start-of-frame delimiter (SFD), which is temporally after the preamble (PR) in the synchronization header (SHR, PR, SFD) and is temporally before the data payload field (PSDU), the transmission device (1, 1') comprising a fifth generator (19) to generate fifth synchronization field symbols (SSFD2) from at least one fourth symbol (M) generated by the fourth generator (13)

the time sequencing device (14) being capable of sequencing the fifth synchronization field symbols (SSFD2) in the synchronization header of the sequence (SEQ) of symbols by partially or totally replacing symbols (SSFD) of the start-of-frame delimiter (SFD).

A second object of the invention is a device (2, 2') that receives an ultra-wideband type signal (100), the receiving device (2, 2') comprising an antenna (3), capable of receiving the signal (200) comprising a sequence (SEQ) of symbols, the sequence (SEQ) of symbols comprising a synchronization header (SHR, PR, SFD) comprising first synchronization header symbols (SPR, SSFD), and a data payload field (PSDU) temporally after the synchronization header and comprising third data payload symbols (SDU), where the receiving device comprises a fourth generator (13) to generate at least one fourth secret symbol (M), a time sequencing device (21) to determine at least one time position (P2) of at least one fourth secret symbol (M), provided by the fourth generator (13), in the sequence (SEQ) of signal symbols (200) received by the antenna (3).

For example, the time position (P2) is found by correlation, or is predefined by a pseudo-random sequence, or is derived from a secret key (CLS). The time sequencing device (21) can have the same capabilities as the time sequencing device (14) of the transmitter with respect to the determination of the positions of the fourth symbols (M).

According to one embodiment, the fourth generator (13) generates at least one fourth secret symbol (M) based on a prescribed secret key (CLS).

According to one embodiment, at least one fourth secret symbol (M) is pseudo-random.

According to one embodiment, the fourth generator (13) is capable of generating a sequence of the fourth secret symbols (M), which has a cross-correlation coefficient with the preamble symbol sequence (SPR) less than or equal to 0.2.

According to one embodiment, the fourth generator (13) is capable of generating a sequence of the fourth secret symbols (M), which has an autocorrelation coefficient greater than or equal to 0.8 at a single point and less than 0.2 at any other point.

According to one embodiment, the fourth generator (13) is configured to generate at least one fourth secret symbol (M) from at least one predetermined spreading code.

According to one embodiment, the predetermined spreading code is obtained from a prescribed secret key (CLS).

According to one embodiment, the fourth generator (13) has a memory (15), wherein several spreading codes (CE) are recorded and a selection device enabling the selection, on the basis of the prescribed secret key (CLS), of the predetermined spreading code among the spreading codes (CE) present in the memory (15).

According to one embodiment, the transmission device comprises a fifth pseudo-random generator (17) to generate a specified number of spreading (CE) codes based on the prescribed secret key (CLS) and a selection device enabling the selection, on the basis of the prescribed secret key (CLS), of the predetermined spreading code among the spreading codes (CE) generated by the fifth pseudo-random generator (17).

According to one embodiment, the time position (P2) of at least one fourth secret symbol (M) is obtained by searching, for example by correlation.

According to one embodiment, the time position (P2) of at least one fourth secret symbol (M) is predetermined.

According to one embodiment, the time position (P2) of at least one fourth secret symbol (M) is determined by the time sequencing device (21) based on a prescribed secret key (CLS'). This prescribed secret key (CLS') may be identical to or distinct from (CLS).

According to one embodiment, the receiving device (2, 2') additionally comprises a calculation device (22) to calculate, based on the time position (P2) of at least one fourth secret symbol (M) and symbol (M), a signal time of arrival (T) (200), for example by a leading edge search.

According to one embodiment, the receiving device (2, 2') comprises a decryption device (23) for decrypting, on the basis of a prescribed secret key (CLS"), the sequence (SEQ) of signal symbols (200) received by the antenna (3).

According to one embodiment, the receiving device (2, 2') comprises a detector (25) capable of detecting a field (SFD2) composed of symbols (SSFD2) constructed from symbols (M).

According to one embodiment, the receiving device (2, 2') is part of a device for the estimation of arrival time.

According to one embodiment, the signal (200) comprises a start-of-frame delimiter (SFD), which is temporally after the preamble (PR) in the synchronization header (SHR, PR, SFD) and is temporally prior to the data payload field (PSDU), the receiving device (2, 2') comprises a detector (24) capable of detecting the start-of-frame delimiter (SFD) and its position in the sequence (SEQ).

According to one embodiment, the signal (200) comprises a synchronization field (SFD2) that partially or totally replaces a start-of-frame delimiter (SFD), which is temporally after the preamble (PR) in the synchronization header (SHR, PR, SFD) and is temporally prior to the data payload field (PSDU), the receiving device (2, 2') has a detector (25) capable of detecting the synchronization field (SFD2) composed of fifth symbols (SSFD2) constructed from the fourth symbols (M).

A third object of the invention is a transceiver (A), where it comprises a transmission device (1) as described above for transmitting, by the antenna, (3) a first ultra-wideband type signal (100) to a remote apparatus (B), the antenna (3) being capable of receiving from the remote apparatus (B) a second ultra-wideband type signal (200) in response to the first signal (100)

the transceiver (A) further comprising a time sequencing device (21) to determine a second time position (P2) of at least one fourth secret symbol (M), provided by the fourth generator (13), in the sequence (SEQ) of symbols of the second signal (200), having been received by the antenna (3)

the transceiver (A) further comprising a calculation device (22) to calculate, from a first time position (P1), of the at least one fourth secret symbol (M) in the sequence (SEQ) of symbols of the first signal (100) having been transmitted and of the second time position (P2) having been determined, a distance (D) between the transceiver (A) and the remote apparatus (B).

In one embodiment, the transceiver (A) is part of a device that estimates the arrival time.

A fourth object of the invention is a method of transmitting an ultra-wideband-type signal (100), wherein first synchronization header symbols (SPR, SSFD) are generated by a first generator (11) and third data payload symbols (SDU) are generated by a third generator (12), where at least one fourth secret symbol (M) is generated by a fourth generator (13), the first and third symbols (SPR, SSFD, SDU) in a sequence (SEQ) of symbols are sequenced by a time sequencing device (14), successively comprising the first symbols (SPR, SSFD) in the synchronization header (SHR, PR, SFD) and the third symbols (SDU) in the data payload field (PSDU), inserting in addition at least one fourth secret symbol (M) in the sequence (SEQ) of symbols, the signal (100) comprising the sequence (SEQ) of symbols is transmitted by at least one antenna (3).

A fifth object of the invention is a method of receiving an ultra-wideband-type signal (200), wherein a signal comprising a sequence (SEQ) of symbols is received by an antenna (3), the sequence (SEQ) of symbols comprising a synchronization header (SHR, PR, SFD) comprising first symbols (SPR, SSFD) of synchronization header and a data payload field (PSDU) temporally after at the synchronization header (SHR, PR, SFD) and comprising data payload symbols (SDU), where at least one fourth secret symbol (M) is generated by a fourth generator (13), at least one time position (P2) of the at least one fourth secret symbol (M), provided by the fourth generator (13), in the sequence (SEQ) of signal symbols (200) received by the antenna (3), is determined by a time sequencing device (21).

The invention will be better understood by reading the following description, provided solely by way of non-limiting example with reference to the accompanying drawings, in which:

FIGS. 1 and 7 schematically represent a transmission device and a receiving device, which can be used according to one embodiment of the invention, FIGS. 2, 3, 4, 5 and 6 are schematic views representing, as a function of time, a signal that can be sent from a transmitting device to a receiving device, according to several embodiments of the invention.

FIGS. 1 and 7 depict an embodiment of a transmission device 1 of a signal 100, comprising a first generator 11 capable of generating first preamble symbols SPR, a second generator 18 for generating second physical layer header symbols SPHR and a third generator 12 for generating third data payload symbols SDU.

The second generator 18, the second physical layer header symbols SPHR, the entry 143 and the physical layer header PHR are optional.

In another embodiment, the second physical layer header symbols SPHR, the entry 143 and the physical layer header PHR are not provided.

The signal 100 can for example be an ultra-wideband-type signal. The signal 100 comprises a physical layer header SHR, itself comprising a preamble PR and a start-of-frame delimiter SFD temporally after the preamble PR. The signal 100 further comprises a data payload field PSDU, temporally after the start-of-frame delimiter SFD.

According to one embodiment, signal 100 and/or signal 200 and/or the physical layer header SHR and/or the preamble PR and/or the first preamble symbols SPR and/or the start-of-frame delimiter and/or the first symbols SSFD of start-of-frame delimiter and/or the physical layer header PHR and/or the second SPHR symbols of the physical layer header and/or the data payload field SDU and/or the third data payload symbols SDU conform to the IEEE802.15.4a standard.

Figure 2:
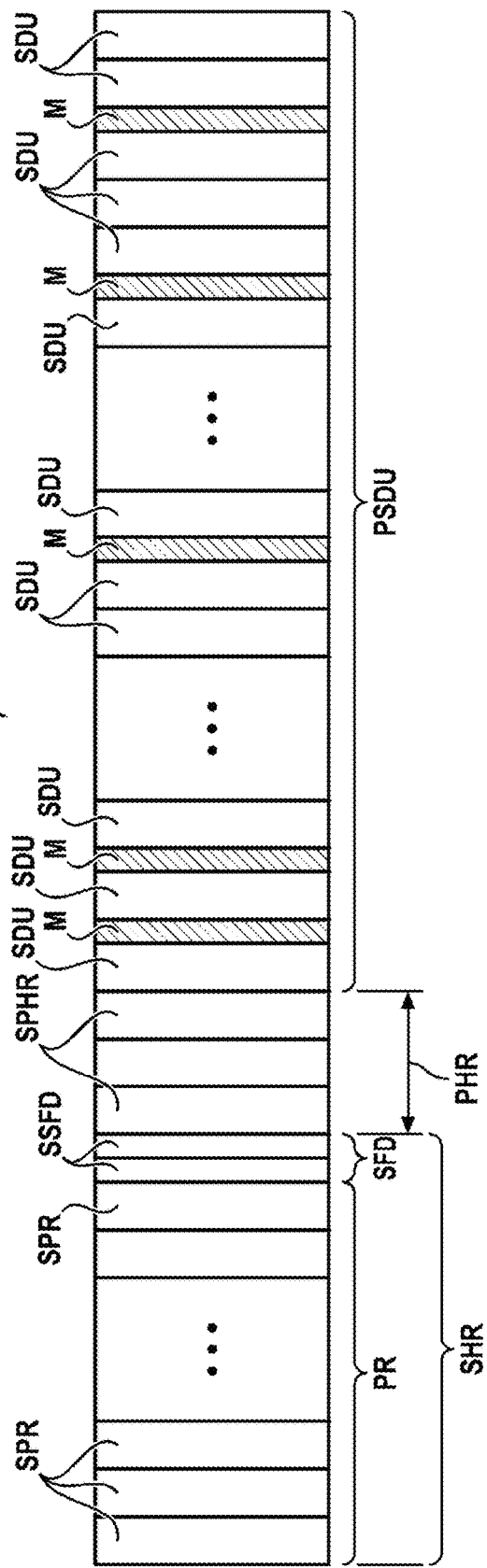
FIG. 2 illustrates a schematic view representing, as a function of time, a signal that can be sent from a transmitting device to a receiving device, according to some embodiments of this disclosure.

According to one embodiment, represented in FIG. 2, one or more fourth secret symbol(s) M are inserted in the data payload field PSDU. The transmission device 1 comprises a time sequencing device 14 configured to insert the fourth secret symbol(s) M between some of the third data payload symbols SDU in the data payload field PSDU. The fourth secret symbol(s) M may for example be interleaved in the data payload field PSDU.

Figure 3:
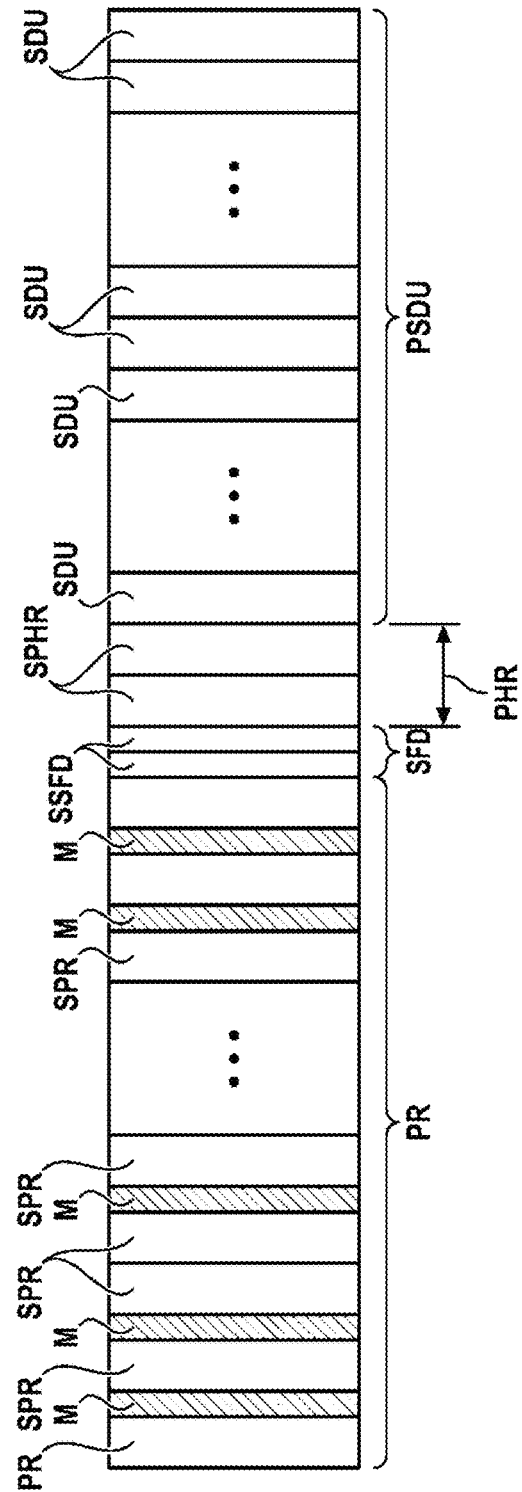
FIG. 3 illustrates another schematic view representing, as a function of time, a signal that can be sent from a transmitting device to a receiving device, according to some embodiments of this disclosure.

According to one embodiment, represented in FIG. 3, one or more fourth secret symbol(s) M are inserted in the preamble PR. The transmission device 1 comprises a time sequencing device 14 configured to insert the fourth secret symbol(s) M between some of the first preamble symbols SPR in the preamble PR. The fourth secret symbol(s) M may, for example, be interleaved in the preamble PR.

Figure 4:
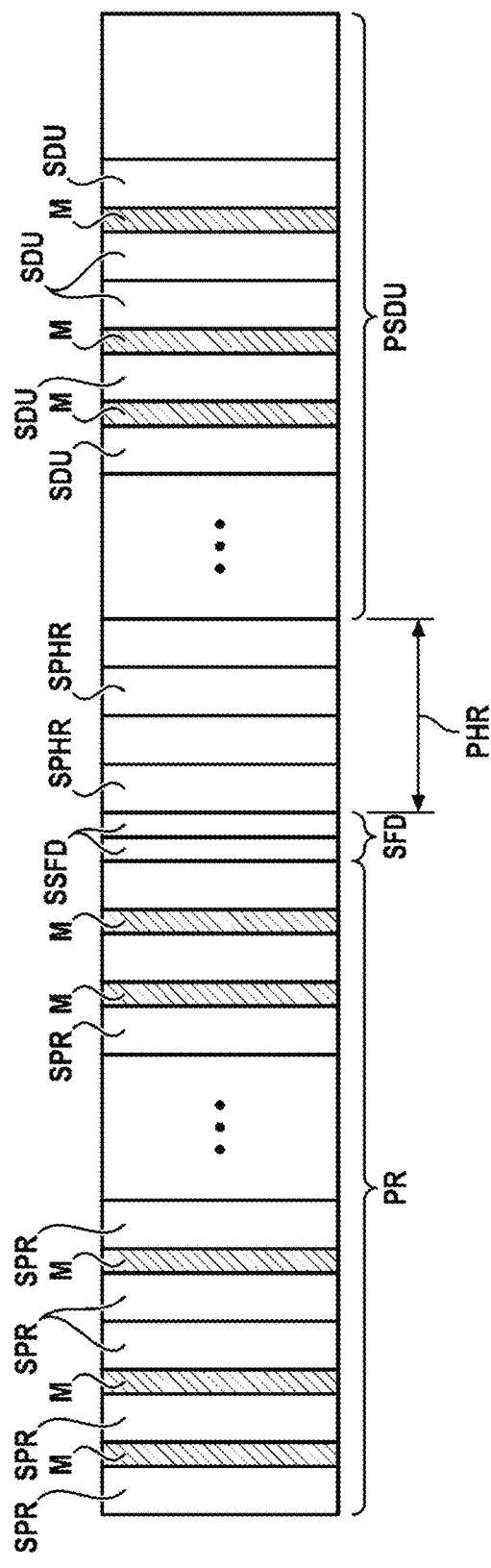
FIG. 4 illustrates another schematic view representing, as a function of time, a signal that can be sent from a transmitting device to a receiving device, according to some embodiments of this disclosure.

According to one embodiment, represented in FIG. 4 one or more fourth secret symbol(s) M are inserted in the preamble PR and in the data payload field PSDU. The transmission device 1 comprises a time sequencing device 14 configured to insert the fourth secret symbol(s) M between some of the third data payload symbols SDU in the data payload field PSDU and between some of the first preamble symbols SPR in the preamble PR. The fourth secret symbol(s) M may, for example, be interleaved in the preamble PR and in the data payload field PSDU.

Figure 5:
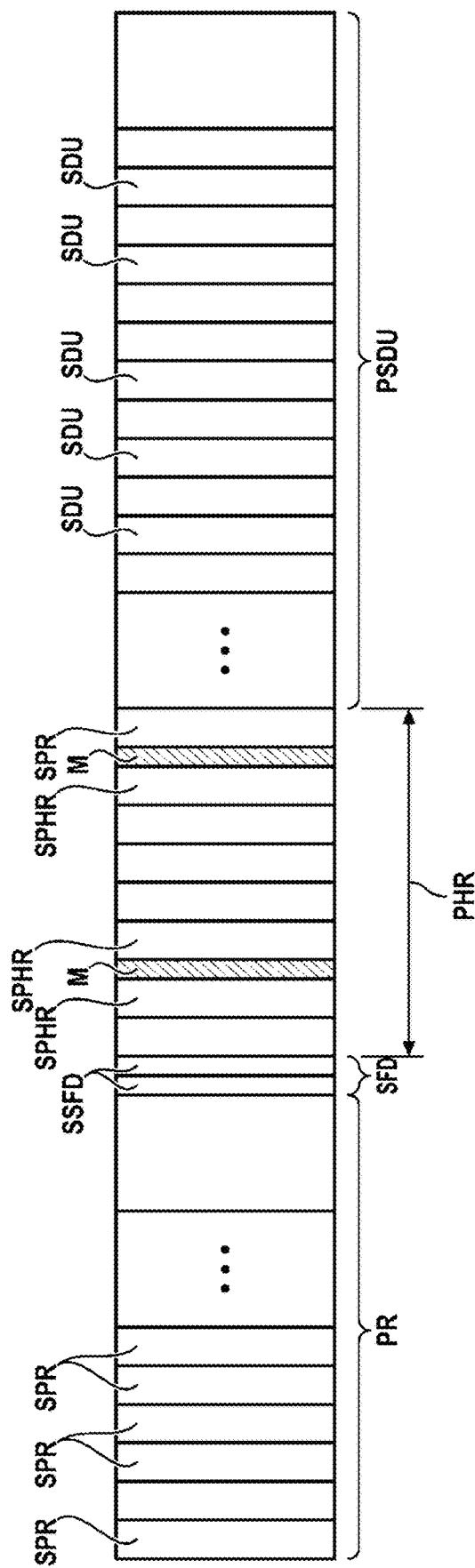
FIG. 5 illustrates another schematic view representing, as a function of time, a signal that can be sent from a transmitting device to a receiving device, according to some embodiments of this disclosure.

According to one embodiment, represented in FIG. 5, one or more fourth secret symbol(s) M are inserted into the physical layer header PHR. The transmission device 1 comprises a time sequencing device 14, configured to insert the fourth secret symbol(s) M between some of the second physical layer header symbols SPHR in the physical layer header PHR. The fourth secret symbol(s) M may, for example, be interleaved in the physical layer header PHR.

Figure 6:
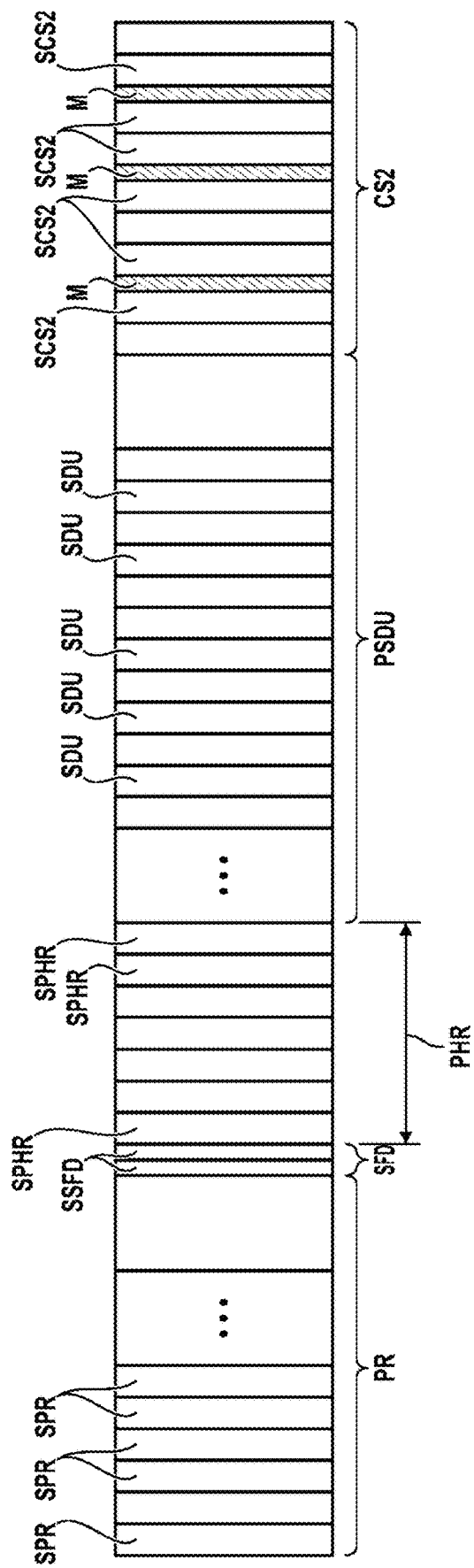
FIG. 6 illustrates another schematic view representing, as a function of time, a signal that can be sent from a transmitting device to a receiving device, according to some embodiments of this disclosure.

According to one embodiment, shown in FIGS. 6 and 7, one or more fourth secret symbol(s) M are inserted in a synchronization field CS2, distinct from the synchronization header SHR and temporally after the data payload field PSDU. The transmission device 1 comprises a fifth generator 19 to generate fifth synchronization field symbols SCS2. The transmission device 1 comprises a time sequencing device 14 configured to insert the fourth secret symbol(s) M between some of the fifth synchronization field symbols SCS2 in the synchronization field CS2. The fourth secret symbol(s) M may, for example, be interleaved in synchronization field CS2. In one embodiment, the field CS 2 can be provided in addition to the delimiter SFD. In another embodiment, the delimiter SFD is not provided and the field CS2 is provided.

In the following, a fourth symbol M or a plurality of fourth symbols M can be provided as the fourth symbol M.

At least one fourth secret symbol M is or comprises a symbol M' for estimating the instant of arrival of the signal 100 and enables a confidential channel response to be estimated and obtained.

The transmission device 1 comprises a fourth generator 13 capable of generating the fourth secret symbol(s) M.

According to one embodiment, the fourth generator (13) is configured to generate the fourth secret symbol(s) M on the basis of a prescribed secret key CLS. The fourth secret symbol(s) M can be selected on the basis of the prescribed secret key CLS. According to one embodiment, the fourth secret symbol(s) M generated by the fourth generator 13 can be for example pseudo-random. Of course, the fourth generator 13 can be other than pseudo-random.

According to one embodiment, the prescribed secret key CLS is shared between the transmission device 1 and a receiving device 2, 2', which will be described below, i.e., the prescribed secret key CLS is known by the transmission device 1 and by the receiving device 2, 2', apart from the messages 100 and 200. According to one embodiment, the prescribed secret key CLS is stored in a memory 15 of the transmission device 1 and/or of the receiving device 2, 2'.

Thus, the time sequencing device 14 enables the symbols SPR, SSFD, SPHR, SDU and M to be sequenced in a sequence of symbols SEQ. This sequence of symbols SEQ is schematically represented in FIGS. 2 to 6 showing the temporal succession of symbols SPR, SSFD, SPHR, SDU and M.

In FIG. 1, the time sequencing device 14 comprises respectively first, second, third, fourth and fifth entries 141, 142, 143, 144, 145 for respectively receiving the preamble symbols SPR, the delimiter symbols SSFD, the second physical layer header symbols SPHR, the third data payload symbols SDU and the fourth symbol(s) M, which are provided by the generators 11, 18, 12, 13. The time sequencing device 14 comprises an output 149 providing the sequence SEQ thus generated to an antenna 3 capable of transmitting the signal 100 comprising the sequence SEQ of symbols. In FIG. 7, the time sequencing device 14 comprises, in addition to FIG. 1, a sixth entry 146 used to receive the fifth synchronization field symbols SCS2 provided by the generator 19, for example when the field CS2 is provided and the SFD delimiter is not provided.

Thus, in FIGS. 2 and 4, the fourth secret symbol(s) M are incorporated into the data payload field PSDU of the signal 100, which is most often encrypted or encoded. This guarantees the confidentiality of the fourth secret symbol(s) M. Thus, a fraudster will not be able to know this or these fourth symbol(s) M beforehand. Moreover, compared to the document WO 2007/021292, one avoids having to transmit, in addition to the signal 100, another signal transmitted before or after the signal 100 and containing another response time delay information, which is costly in terms of energy. The system in the document WO 2007/021292 remains vulnerable in any case, since the synchronization fields continue to be included in the unencrypted preamble of the first ranging message sent by the first apparatus to the second apparatus, the second apparatus having to send a second message to the first apparatus in response to the first message to determine the distance between them. The invention thus ensures that a fraudster does not have access to any temporal information used to calculate the distance.

In one embodiment of the invention, the time position of the fourth symbol(s) M in the preamble PR and/or in the start-of-frame delimiter SFD and/or in the physical layer header PHR and/or in the data payload field PSDU and/or in the synchronization field CS2 is fixed in advance.

In another embodiment of the invention, the time position of the fourth symbol(s) M in the preamble PR and/or in the start-of-frame delimiter SFD and/or in the physical layer header PHR and/or in the data payload field PSDU and/or in the synchronization field CS2 is generated in a pseudo-random manner by the device 14 and/or the time position of the fourth secret symbol(s) M can be generated from the prescribed secret key CLS' by the device 14. Sequencing may depend on the secret key CLS'. This makes it even more complicated for a fraudster to intercept the synchronization symbol(s). Of course, this time position can be generated by any method other than pseudo-randomly.

In another embodiment of the invention, the time position of the fourth secret symbol(s) M may be based on any part of the content of the data payload symbols SDU or symbols SPHR before or after their encryption.

In another embodiment of the invention, at least one of the fourth secret symbol(s) M may be based on all or part of the content of the data payload symbols SDU or the symbols SPHR before or after their encryption, for example by a hash function.

According to one embodiment, the transmission device 1 comprises a cryptographic device 16 to encrypt the data payload field PSDU in the symbol sequence SEQ based on the prescribed secret key CLS". According to one embodiment, the signal 100 transmitted by the antenna 3 contains the data field PSDU encrypted by the cryptographic device 16. Thus, the fourth secret symbol(s) M are encrypted by the prescribed secret key CLS.

According to one embodiment, the cryptographic device 16 is for example provided in or associated with the time sequencing device 14, receiving the second data payload symbols SDU present on the fourth entry 144 and the fourth secret symbol(s) M present in the fifth entry 145.

According to one embodiment, the fourth generator 13 is configured to generate the fourth symbol M or the plurality of fourth symbols M from a predetermined spreading code.

For example, the phase of at least one, of several or of each of the fourth symbols M can also be randomized, so that the position of the direct path in this or these fourth symbol(s) M is only known by authorized devices 1, 2 and/or 1' and/or 2' or previously authenticated devices.

According to one embodiment, the fourth generator 13 is capable of generating the fourth synchronization symbol M or the plurality of fourth synchronization symbols M by code-division multiple access (CDMA). According to this technique, the fourth secret symbol(s) M are obtained by time multiplication by the spreading code.

According to one embodiment, the spreading code used to generate the fourth secret symbol(s) M is different from another spreading code used to generate the first symbols SPR of the preamble and can be selected in a pseudo-random manner from a dictionary comprising a predetermined number of different spreading codes, for example eight, or directly from a pseudo-random sequence generator. The spreading code selected to generate the fourth secret symbol(s) M is known only to authorized devices 1, 2 and/or 1' and/or 2' or previously authenticated and can be obtained from the prescribed secret key CLS. The spreading code may be different for each fourth symbol M, for example using a sequence of spreading code hopping only known to authorized devices 1, 2 and/or 1' and/or 2' or previously authenticated devices. The spreading code(s) used to generate the fourth secret symbol(s) M are selected for their high autocorrelation and low cross-correlation.

According to one embodiment, the predetermined spreading code is obtained from the prescribed secret key CLS.

According to one embodiment, the fourth generator 13 comprises a memory 15 wherein multiple spreading codes CE are recorded and a selection device for selecting, on the basis of the prescribed secret key CLS, the predetermined spreading code among the spreading codes CE present in the memory 15.

According to one embodiment, the transmission device 1 comprises a fifth pseudo-random generator 17 to generate a specified number of spreading codes CE based on the prescribed secret key CLS. These spreading codes CE generated by the fifth generator 17 can be stored in the memory 15.

According to one embodiment, the transmission device 1 comprises a selection device for selecting, on the basis of the prescribed secret key CLS, the predetermined spreading code among the spreading codes CE generated by the fifth pseudo-random generator 17.

The transmission device 1, for example, can be part of a first transceiver A. The signal 100 is sent to the antenna 3 of the device 1 and/or transceiver A for transmitting the signal 100, called first signal 100, externally to a second remote apparatus B.

The remote apparatus B is capable of receiving the first signal 100 and returning, in response to the antenna 3' from this remote apparatus B, a second response signal 200 to the first signal 100. The second response signal 200 can be, for example, an ultra-wideband type signal. The first transceiver A comprises a receiving device 2 to externally receive this second response signal 200, for example by the antenna 3 also connected to this receiving device 2 and/or another antenna connected to the receiving device 2.

According to one embodiment, the first signal 100 and/or the second signal 200 is a signal also used for localization.

According to one embodiment, the receiving device 2 is capable of estimating a channel response based on the second signal 200 received.

According to one embodiment, the first transceiver A and/or the receiving device 2 comprises a decryption device 23 to decrypt the data field PSDU in the second response signal 200 received on the basis of the prescribed secret key CLS". The decryption device 23 has access to the prescribed secret key CLS", used to encrypt the data payload field PSDU of the first signal 100 transmitted, for example by accessing the memory 15 where this secret key prescribed CLS" is prerecorded.

According to one embodiment, the first transceiver A and/or the receiving device 2 comprises a temporal analysis device 21 for detecting and calculating at least one time position P2 of at least one fourth secret symbol(s) M in the data field PSDU of the second signal 200, having been received by the antenna 3. The fourth secret symbol(s) M may be provided to the receiving device 2 by the fourth generator 13 of the transmission device 1 or by another generator providing one or more symbol(s) M identical to those provided by the fourth generator 13, and designated below by fourth generator 13.

The first time position of the fourth secret symbol(s) M in the first signal 100 transmitted, may also be prescribed in the transmission device 1 and/or in the analysis device 21.

According to one embodiment, the transceiver A comprises a calculation device 22 to calculate, from the time position P2 of the fourth secret symbol(s) M in the second signal 200 received, having been calculated, a distance D between the first transceiver A and the remote apparatus B or an estimate of the time T of arrival of the signal (200), for example by a leading edge search.

In the analysis device 21, the second time position P2 can be calculated by cross correlation of the second received signal 200 with the fourth secret symbol(s) M, provided by the fourth generator 13. For each fourth symbol M, the second time position P2 corresponds to the position of the largest cross-correlation peak of the second signal received 200 with the fourth symbol M. The analysis device 21 can, for example calculate the cross-correlation product of the second received signal 200 with at least one or successively each of the fourth symbols M, to determine each time the second time position P2 of each maximum cross-correlation peak in this product.

According to one embodiment, the fourth secret symbol(s) M have a first autocorrelation coefficient greater than or equal to a first threshold determined at a single point and less than a second threshold at any other point. For example, the fourth secret symbol(s) M may have a first autocorrelation coefficient greater than or equal to 0.8 at a single point and less than 0.2 at any other point.

According to one embodiment, the fourth secret symbol(s) M have a cross-correlation coefficient less than or equal to a determined threshold with all the other symbols. For example, the fourth secret symbol(s) M may have a first cross-correlation coefficient less than or equal to 0.2 in any other point.

According to one embodiment, the fourth secret symbols M belong to a family of binary or ternary sequences.

According to one embodiment, the fourth secret symbols M form a sequence having a low cross-correlation (for example less than 0.2) with the sequence [111 . . . 11].

According to one embodiment, the fourth secret symbols M form a sequence having a minimum autocorrelation function (for example less than 0.2) at any point and maximum (e.g., greater than 0.8) in only one point.

According to one embodiment, the fourth secret symbols M form a sequence having a low cross-correlation value (for example less than 0.2) with the sequence of the start-of-frame delimiter, recommended by the IEEE 802.15.4a standard.

The temporal analysis device 21 and the calculation device 22 for example are part of the receiving device 2 present in the first transceiver A.

The second remote device B may also be a second transceiver B analogous to the first transceiver A. The second transceiver B may comprise a transmission device 1' similar to the transmission device 1 described above and a receiving device 2' similar to the receiving device 2.

According to one embodiment, the remote device B is configured to return by its transmission device 1' the second signal 200 in response to receiving the first signal 100 by its receiving device 2'.

According to one embodiment, the data payload field PSDU and/or the third data payload symbols SDU comprise at least one identifier. For example, the first signal 100 comprises, in the data payload symbols SDU, an identifier of the device 1 for transmission and/or the first transceiver A. For example, the third data payload symbols SDU of the second signal 200 may include a second identifier of the second transmitting device (1') and/or the second receiving device (2') and/or of the second remote apparatus B and/or the second transceiver B, and/or the first identifier present in the first signal 100. According to one embodiment, the data payload field PSDU and/or the third data payload symbols SDU comprise data and/or information for calculating the signal time-of-flight T and/or sensor data and/or the size of the data payload field PSDU.

Of course, the first signal 100 and/or the second signal 200 may include other data in its data payload field SDU.

According to one embodiment, the preamble PR may comprise or be formed of a periodic and continuous temporal repetition of one or more first symbol(s) PR (nothing between the first symbols PR), with or without insertion of the fourth symbol(s) M between some of the first symbols PR. According to one embodiment, to find the start-of-frame delimiter SFD in the received signal 100, the receiving device 2 comprises a means of analysis for searching for the repetition period of the first symbol(s) PR in the sequence SEQ of the received signal 100 and/or to detect the location where there is no longer a first symbol PR in the sequence SEQ of the received signal 100. According to one embodiment, the start-of-frame delimiter SFD may have the same size as the repetition period of the first symbols PR. The physical layer header PHR may contain in its symbols SPHR the size of the data payload field PSDU.

According to one embodiment, the receiving device 2 may be a device located remotely from the transmission device 1 and/or not be part of transceiver A.

Transceiver A and/or transmission device 1 and/or the receiving device 2 may for example be associated with or be part of a distance estimation device, to estimate the distance D between the transceiver A and/or a device for estimating an angle of arrival of the second signal 200 and/or a device for estimating the arrival time difference T (TDOA), or other devices, which use the time position P2 of at least one fourth secret symbol M for calculating a signal 200 arrival time T and/or a difference between several times T of arrival of several signals 200. The transceiver A may for example be associated with or be part of a localization device, to locate the remote device B by determining at least the distance D and/or an arrival angle of the second signal 200.

The transceiver A may for example be associated with or be part of a device for locking a resource or a security device. This resource can be for example a door or an opening, or a machine or a computer or others. The locking device or security device can be used for example to open a door or an opening to at least one authorized person, the remote apparatus B can be a badge, a label or more generally an object worn by a person or by another object.

According to one embodiment, the transmission device 1 and/or the transceiver A implements the transmission method as described above. According to one embodiment, the receiving device 2 and/or the transceiver A implements the transmission method as described above.

Examples of embodiments of the invention are described below. These embodiments are, of course, not limiting and the invention can be implemented differently than them. In addition, any of the features indicated in any of the embodiments mentioned below may be taken generally from the invention, regardless of the other features of these examples.

In a first embodiment of the invention, the messages 100 or 200 are constituted as follows:

a. A preamble PR (of the synchronization header SHR) consisting of 16 to 1024 preamble symbols SPR each formed by the insertion of 3 to 63 '0's between the symbols of a binary or ternary sequence showing maximum autocorrelation at only a single point and minimal or ideally zero at any other point. For example the sequence [−1 0 0 0 0 +1 0 −1 0 +1 +1 +1 0 +1 −1 0 0 0 +1 −1 +1 +1 +1 0 0 −1 +1 0 −1 0 0] or any other sequence mentioned in Table 39d of the 2007 IEEE 802.15.4a standard meets these requirements. The symbols SPR are therefore assumed to be known and public.

b. A private packet start delimiter field SFD formed by the insertion of 8 to 64—typically 15—fourth symbols M in the symbols SSFD. These fourth symbols M are constituted in a manner similar to the preamble symbols SPR, insofar as they use a sequence with a maximum autocorrelation at one point and minimal or zero at any other point, spread by the insertion of 3 to 63 '0's between the symbols SSFD of the sequence. The sequence of the fourth symbols M is further chosen so that (i) it has a low cross-correlation, for example less than 0.2, with the sequence chosen for symbols SPR; (ii) it is known only to transmitter A and the receiver B, previously authenticated by message 100 or 200. The fourth symbols M are further modified so that the polarity of each fourth symbol M of the field SFD is altered by a Kasami sequence known only to the transmitter A and the receiver B, previously authenticated with message 100 or 200. For example, the sequence [1 −1 −1 −1 1 −1 −1 1 1 −1 1 −1 1 1 1] is one such sequence. The SFD can use as fourth symbols the same synchronization symbols as the preamble PR. It is possible to apply a combination with an information sequence (for example by multiplying each time chip of a fourth symbol by a coefficient of the sequence) having the following properties:

it is part of a family of binary or ternary sequences,
    each member of this family has a weak cross-correlation (e.g., <0.2) with the sequence [111 . . . 1 1],
    each member of this family has a minimal autocorrelation function (e.g., less than 0.2) at any point and maximum (e.g., greater than 0.8) in one single point,
    each member of this family has a low cross-correlation value (e.g., <0.2) with the sequence SFD recommended by the IEEE 802.15.4a standard
    members of this family have a minimal cross-correlation function (e.g., <0.2) two to two.

This part b corresponds for example to the case where the delimiter SFD is not provided and where the field SFD2 is provided (e.g., confidential field SFD 2).

c. A packet header field PHR as described in the IEEE 802.15.4a-2007 standard.

d. A data payload field PSDU, as described in the IEEE 802.15.4a-2007 standard, whose data payloads SDU transported at the MAC level are encrypted by any means conventionally used in the state of the art to guarantee the authenticity and confidentiality of exchanges.

In this example, the choice of the spreading sequence used for the fourth symbols M and that of the Kasami sequence is based on a shared secret between the transmitter A and the receiver B of the messages 100 and 200 and can be based on the content of previous messages exchanged between the parties. The choice of said sequences may eventually vary over time to avoid being learned by an undesirable third party.

In a second embodiment of the invention, the messages 100 or 200 are constituted as follows:

a. a preamble PR (of the synchronization header SHR) composed of 16 to 1024 preamble symbols SPR each formed by the insertion of 3 to 63 '0's between the symbols of a binary or ternary sequence having maximum autocorrelation only at a single point and minimal or ideally zero at any other point. For example the sequence [−1 0 0 0 0 +1 0 −1 0 +1 +1 +1 0 +1 −1 0 0 0 +1 −1 +1 +1 +1 0 0 −1 +1 0 −1 0 0] or any other sequence mentioned in Table 39d of the 2007 IEEE 802.15.4a standard meets these requirements. The symbols SPR are therefore assumed to be known and public.

b. a SFD start-of-frame delimiter formed by the multiplication of 8 or 64 preamble symbols SPR by the sequence [0 +1 0 −1 +1 0 0 −1 0 +1 0 −1 +1 0 0 −1 −1 0 0 +1 0 −1 0 +1 0 +1 0 0 0 −1 0 −1 0 −1 0 0 +1 0 −1 −10 −1+1 0 0 0 0 +1 +1 0 0 −1 −1 −1 +1 −1 +1 +1 0 0 0 0 +1 +1] (or only the first 8 symbols of the latter) as recommended in IEEE-802.15.4a-2007.

c. A packet header field PHR as described in the IEEE 802.15.4a-2007 standard.

d. A data payload field PSDU, as described in the IEEE 802.15.4a-2007 standard, whose data payloads SDU transported at the MAC level are encrypted by any means conventionally used in the state of the art to guarantee the authenticity and confidentiality of exchanges.

e. A second synchronization field (also referred to as a posterior synchronization field or "postamble") inserted into the sequence of symbols SEQ following the data payload field PSDU, said second synchronization field comprising 1 to 64—typically 15—fourth symbols M of structure similar to that of the symbols SPR, insofar as they are formed by the insertion of 3 to 63 '0's between the symbols of a sequence chosen from those of Table 39d of the IEEE 802.15.4a-2007 standard or any other similar sequence. The sequence chosen for the fourth M symbols differs from that used for the symbols SPR and is chosen so that (i) the cross-correlation between these two sequences is low and for example less than 0.2 and (ii) the selected sequence is known only to the authenticated transmitter and receiver. The polarity of each of the fourth symbols M present in the second synchronization field is furthermore modified by a Kasami sequence known only to the transmitter A and the receiver B, previously authenticated with the message 100 or 200. For example, the sequence [1 −1 −1 −1 1 −1 −1 1 1 −1 1 −1 1 1] is such a Kasami sequence.

In a third embodiment of the invention, the messages 100 or 200 are constituted as follows:

a. a preamble PR (of the synchronization header SHR) composed of 16 to 1024 preamble symbols SPR each formed by the insertion of 3 to 63 '0' between the symbols of a binary or ternary sequence having maximum autocorrelation only at a single point and minimal or ideally zero at any other point. For example the sequence [−1 0 0 0 0 +1 0 −1 0 +1 +1 +1 0 +1 −1 0 0 0 +1 −1 +1 +1 +1 0 0 −1 +1 0 −1 0 0] or any other sequence mentioned in Table 39d of the 2007 IEEE 802.15.4a standard meets these requirements. The symbols SPR are therefore assumed to be known and public.

b. a SFD start-of-frame delimiter formed by the multiplication of 8 or 64 preamble symbols SPR by the sequence [0 +1 0 −1 +1 0 0 −1 0 +1 0 −1 +1 0 0 −1 −1 0 0 +1 0 −1 0 +1 0 +1 0 0 0 −1 0 −1 0 −1 0 0 +1 0 −1 −1 0 −1 +1 0 0 0 0 +1 +1 0 0 −1 −1 −1 +1 −1 +1 +1 0 0 0 0 +1 +1] (or only the first 8 symbols of the latter) as recommended in IEEE-802.15.4a-2007.

c. A packet header field PHR as described in the IEEE 802.15.4a-2007 standard.

d. A data payload field PSDU, as described in the IEEE 802.15.4a-2007 standard, whose data payloads SDU transported at the MAC level are encrypted by any means conventionally used in the state of the art to guarantee the authenticity and confidentiality of exchanges.

e. Fourth synchronization symbols M inserted between the data payload symbols SDU of the field PSDU. The duration of the fourth symbols M is chosen so that it is an exact multiple of the duration of the symbols SDU—typically of the order of 32 to 8205 ns.

Each fourth symbol M is formed of a burst of 16 to 128 time chips each typically 2.003 ns. The fourth symbol M is divided into a set of possible positions for this burst. For example for a fourth symbol M of duration 1025.54 ns and a burst of 16 time chips, there are 16 possible positions of which only one is used among these 16 positions for a fourth given symbol M. The sequence used to modulate the time chips composing the burst is a pseudo-random sequence having a function of maximum autocorrelation at one point and minimal at any other point. This pseudo-random sequence can be, for example, the Kasami sequence [111 −1 −11 −1 −1 −1 −1 −111 −1 −10] or any other sequence of the same family. The position of the burst in each of the fourth symbols M is determined by means of a "time hopping sequence" known only by the transmitter A and the receiver B and determined using the content of the symbols SDU of field PSDU. Each fourth symbol M may further use a different Kasami sequence among a set. For bursts of 16 time chips for example each of the fourth symbols M is chosen from the set {[1 −1 −1 −1 1 −1 −1 1 1 −1 1 −1 1 1 1 0], [−1 −1 1 1 1 1 1 1 −1 1 1 1 −1 1 −1 0], [1 1 1 −1 −1 1 −1 −1 −1 −1 −1 1 1 −1 −1 0], [1 1 1 −1 −1 1 1 −1 −1 −1 −1 −1 1 1 1 −1 −1 0]}.

In a fourth embodiment of the invention, the messages 100 or 200 are constituted as follows:

a. a preamble PR (of the synchronization header SHR) composed of 16 to 1024 preamble symbols SPR each formed by the insertion of 3 to 63 '0's between the symbols of a binary or ternary sequence having maximum autocorrelation at only a single point and minimal or ideally zero at any other point. For example the sequence [−1 0 0 0 0 +1 0 −1 0 +1 +1 +1 0 +1 −1 0 0 0 +1 −1 +1 +1 +1 0 0 −1 +1 0 −1 0 0] or any other sequence mentioned in Table 39d of the 2007 IEEE 802.15.4a standard meets these requirements. The symbols SPR are therefore assumed to be known and public.

b. a SFD start-of-frame delimiter formed by the multiplication of 8 or 64 preamble symbols SPR by the sequence [0 +1 0 −1 +1 0 0 −1 0 +1 0 −1 +1 0 0 −1 −1 0 0 +1 0 −1 0 +1 0 +1 0 0 0 −1 0 −1 0 −1 0 0 +1 0 −1 −1 0 −1 +1 0 0 0 0 +1 +1 0 0 −1 −1 −1 +1 −1 +1 +1 0 0 0 0 +1 +1] (or only the first 8 symbols of the latter) as recommended in IEEE-802.15.4a-2007.

c. A packet header field PHR as described in the IEEE 802.15.4a-2007 standard.

d. A data payload field PSDU, as described in the IEEE 802.15.4a-2007 standard, whose data payloads SDU transported at the MAC level are encrypted by any means conventionally used in the state of the art to guarantee the authenticity and confidentiality of exchanges.

e. Fourth synchronization symbols M inserted between the data payload symbols SDU of the field PSDU. The duration of the fourth symbols M is chosen so that it is an exact multiple of the duration of the symbols SDU—typically of the order of 32 to 8205 ns. These fourth symbols M are each formed by the insertion of 3 to 63 '0's between the symbols of a binary or ternary sequence having maximum autocorrelation at only a single point and minimal or ideally zero at any other point. For example the sequence [−1 0 0 0 0 +1 0 −1 0 +1 +1 +1 0 +1 −1 0 0 0 +1 −1 +1 +1 +1 0 0 −1 +1 0 −1 0 0] or any other sequence mentioned in table 39d of the 2007 IEEE 802.15.4a standard meets these requirements. A fourth symbol M comprises as many repetitions of this sequence as its length allows (for example 8), and may eventually be completed by a period of silence.

The position of the fourth M symbols within the field PSDU is determined by a time-hopping sequence known only to the authenticated transmitter A and receiver B of the messages 100 or 200. This time hopping sequence is determined from the encrypted content of the data symbols SDU at the beginning of the field PSDU.

The sequence chosen for the fourth M symbols differs from that used for the symbols SPR and is chosen so that (i) the cross-correlation between these two sequences is low and for example less than 0.2 and (ii) the selected sequence is known only to the authenticated transmitter A and B receiver. Each of the fourth symbols M may use a sequence different from that chosen for the other fourth symbols M. This choice depends on a secret sequence CLS known only to the transmitter A and the receiver B of the messages 100 or 200 and is determined from the encrypted content of the data symbols SDU at the beginning of the field PSDU.

The sequence used for each of the fourth symbols M is further affected by a circular permutation whose depth depends on a secret sequence CLS known only to the transmitter A and the receiver B of the messages 100 or 200 and is determined from the encrypted content of one or more data symbols SDU, appearing for example at the beginning of the field PSDU.

In a more specific embodiment of this example, the field PR comprises 128 preamble symbols SPR followed by a SFD field of 64 symbols. The field PSDU is composed of 128 SDU symbols with a duration of 8205.13 ns each. 8 fourth synchronization symbols M of a duration of 8205.13 ns each are inserted between certain symbols SDU of the field PSDU from the 32th symbol of the latter. For a given message 100 or 200, the symbol M coming chronologically first is inserted between the $32^{nd}$ symbol and the $33^{rd}$ symbol of the field PSDU, the symbol M coming chronologically second is inserted between the $37^{th}$ and $38^{th}$ symbol SDU of the field PSDU, the symbol M coming chronologically third is inserted between the $49^{th}$ and $50^{th}$ symbol SDU 5 of the field PSDU, etc. The symbol M that comes chronologically first uses the sequence 9 of Table 39d of the IEEE 802.15.4a-2007 standard, the symbol M that comes chronologically second uses the sequence 12 of said Table, the symbol M that comes chronologically third uses the sequence 10 of said Table, etc. Finally, the symbol M that comes chronologically first is not affected by any circular permutation of its sequence, the symbol M that comes chronologically second sees its sequence shifted by 13 time chips to the right, the symbol that comes chronologically third sees its sequence shifted by 149 time chips to the left, etc.

The invention claimed is:

1. A transmission device configured to generate an ultra-wideband type signal, wherein the ultra-wideband type signal comprises a synchronization header and a data payload field, the transmission device comprising:
    a first generator configured to generate synchronization header symbols;
    a second generator configured to generate data payload symbols;
    a time sequencing device configured to sequence the synchronization header symbols and the data payload symbols in a sequence of symbols, successively comprising the synchronization header symbols in the synchronization header and the data payload symbols in the data payload field;
    at least one antenna configured to transmit the ultra-wideband type signal comprising the sequence of symbols; and
    a third generator configured to generate at least one secret symbol,
    wherein the time sequencing device is configured to insert the at least one secret symbol in the sequence of symbols.

2. The transmission device according to claim 1, wherein the time sequencing device is configured to insert the at least one secret symbol into the synchronization header or into the data payload field.

3. The transmission device according to claim 1, wherein:
    the synchronization header comprises a preamble and a start-of-frame delimiter, temporally after the preamble and temporally prior to the data payload field,
    the synchronization header symbols comprise preamble symbols and delimiter symbols, and
    the time sequencing device is configured to successively sequence the preamble symbols in the preamble and the delimiter symbols in the start-of-frame delimiter and to insert the at least one secret symbol in the preamble or in the start-of-frame delimiter.

4. The transmission device according to claim 1, wherein the time sequencing device is configured to insert the at least one secret symbol between some or in place of the synchronization header symbols or the data payload symbols or between the synchronization header symbols and the data payload symbols.

5. The transmission device according to claim 1, wherein:
    the synchronization header comprises a preamble and a start-of-frame delimiter, temporally after the preamble and temporally prior to the data payload field,
    the synchronization header symbols comprise a preamble symbol sequence and a delimiter symbol sequence, and
    the third generator is configured to generate a sequence of the secret symbols, which has a cross-correlation coefficient with the preamble symbol sequence, of less than or equal to 0.2.

6. The transmission device according to claim 1, wherein the at least one secret symbol is or comprises a symbol for estimating an instant of arrival of the ultra-wideband type signal or is pseudo-random.

7. The transmission device according to claim 1, wherein the time sequencing device is configured to pseudo-randomly generate a time position of the at least one secret symbol in the sequence of symbols or to generate the time position of at least one fourth secret symbol in the sequence of symbols based, at least in part, on a prescribed secret key.

8. The transmission device according to claim 1, wherein the third generator is configured to generate the at least one secret symbol based, at least in part, on a prescribed secret key or from at least one predetermined spreading code, wherein the at least one predetermined spreading code is obtained from the prescribed secret key.

9. The transmission device according to claim 8, wherein:
the third generator comprises a memory configured to store multiple spreading codes,
a selection device enables selection, based on the prescribed secret key, of the at least one predetermined spreading code among the multiple spreading codes, and
the transmission device further comprises a pseudo-random generator configured to generate the multiple spreading codes based, at least in part, on the prescribed secret key.

10. The transmission device according to claim 1, further comprising:
a cryptographic device configured to encrypt the data payload field in the sequence of symbols based, at least in part, on a prescribed secret key, wherein the ultra-wideband type signal transmitted by the at least one antenna of the transmission device further comprises the data payload field encrypted by the cryptographic device.

11. The transmission device according to claim 1, wherein the third generator is configured to generate the at least one secret symbol from at least one of the data payload symbols.

12. The transmission device according claim 1, wherein:
the ultra-wideband type signal further comprises a synchronization field, which is composed of the at least one secret symbol generated by the third generator, which is separate from and is temporally after the synchronization header, and
the time sequencing device is configured to sequence the at least one secret symbol of the synchronization field in the sequence of symbols after the synchronization header.

13. The transmission device according to claim 1, wherein:
the ultra-wideband type signal further comprises a synchronization field that partially or totally replaces a start-of-frame delimiter, which is temporally after a preamble in the synchronization header and is temporally prior to the data payload field,
the transmission device further comprising a fourth generator configured to generate synchronization field symbols from the at least one secret symbol generated by the third generator, and
the time sequencing device configured to sequence the synchronization field symbols in the synchronization header of the sequence of symbols by partially or totally replacing symbols of the start-of-frame delimiter.

* * * * *